US012769902B2

(12) United States Patent
Enomoto et al.

(10) Patent No.: US 12,769,902 B2
(45) Date of Patent: Oct. 20, 2026

(54) INFORMATION PROCESSING APPARATUS, SIMULATION METHOD, AND INFORMATION PROCESSING SYSTEM

(71) Applicant: Tokyo Electron Limited, Tokyo (JP)

(72) Inventors: Tadashi Enomoto, Iwate (JP); Masakazu Yamamoto, Iwate (JP)

(73) Assignee: TOKYO ELECTRON LIMITED, Tokyo (JP)

(*) Notice: Subject to any disclaimer, the term of this patent is extended or adjusted under 35 U.S.C. 154(b) by 1144 days.

(21) Appl. No.: 17/826,870

(22) Filed: May 27, 2022

(65) Prior Publication Data

US 2022/0391562 A1 Dec. 8, 2022

(30) Foreign Application Priority Data

Jun. 2, 2021 (JP) ................................ 2021-093049

(51) Int. Cl.
*G06F 30/20* (2020.01)
*G06F 119/18* (2020.01)

(52) U.S. Cl.
CPC .......... *G06F 30/20* (2020.01); *G06F 2119/18* (2020.01)

(58) Field of Classification Search
None
See application file for complete search history.

(56) References Cited

U.S. PATENT DOCUMENTS 8,205,629 B2 * 6/2012 Gregor .................... G01F 25/17 137/486
2002/0195710 A1 * 12/2002 Derderian ........... C23C 16/4557 438/653
2006/0252348 A1 * 11/2006 Lin .................... G05B 23/0297 451/41
2008/0028342 A1 * 1/2008 Tsuji ....................... G06F 30/36 716/136

FOREIGN PATENT DOCUMENTS

JP 2004356510 A * 12/2004 ........... E04G 21/121
JP 2007-507888 A 3/2007
JP 2009-052595 A 3/2009
JP 2018-125451 A 8/2018
KR 100390539 B1 * 7/2003 ....... H01L 21/67017
KR 20060062034 A * 6/2006 ............. G06F 30/20

* cited by examiner

*Primary Examiner* — John E Johansen
*Assistant Examiner* — Michael Paul Mirabito
(74) *Attorney, Agent, or Firm* — Venjuris, P.C.

(57) ABSTRACT

An information processing apparatus executes a simulation of a process state being executed in a semiconductor manufacturing apparatus using a simulation model of the semiconductor manufacturing apparatus. The information processing apparatus includes: a physical sensor data acquisition unit that acquires physical sensor data measured at the semiconductor manufacturing apparatus that executes a process according to a process parameter; and a simulation execution unit that executes a simulation by the simulation model according to the process parameter including the physical sensor data, and calculate virtual sensor data and virtual process result data. The physical sensor data acquired by the physical sensor data acquisition unit includes a temperature of a gas introduced into the semiconductor manufacturing apparatus that executes the process.

16 Claims, 11 Drawing Sheets

INFORMATION PROCESSING APPARATUS, SIMULATION METHOD, AND INFORMATION PROCESSING SYSTEM

CROSS-REFERENCE TO RELATED APPLICATION

This application is based on and claims priority from Japanese Patent Application No. 2021-093049 filed on Jun. 2, 2021 with the Japan Patent Office, the disclosure of which is incorporated herein in its entirety by reference.

TECHNICAL FIELD

The present disclosure relates to an information processing apparatus, a simulation method, and an information processing system.

BACKGROUND

The process simulation is used in the field of the manufacture or research and development of semiconductor products. The process simulation may handle various physical phenomena related to a semiconductor process (hereinafter, referred to as a process) by a physical model (see, e.g., Japanese Patent Laid-Open Publication No. 2018-125451). In the process simulation, for example, a state of the process being executed is estimated from the measurement results after the process is executed.

SUMMARY

According to an aspect of the present disclosure, an information processing system executes a simulation of a process state being executed in a semiconductor manufacturing apparatus using a simulation model of the semiconductor manufacturing apparatus. The information processing system includes: a physical sensor data acquisition unit that acquires physical sensor data measured at the semiconductor manufacturing apparatus that executes a process according to a process parameter; and a simulation execution unit that executes a simulation by the simulation model according to the process parameter including the physical sensor data and calculate virtual sensor data and virtual process result data. The physical sensor data acquired by the physical sensor data acquisition unit includes a temperature of a gas introduced into the semiconductor manufacturing apparatus that executes the process.

The foregoing summary is illustrative only and is not intended to be in any way limiting. In addition to the illustrative aspects, embodiments, and features described above, further aspects, embodiments, and features will become apparent by reference to the drawings and the following detailed description.

DETAILED DESCRIPTION

Figure 1:
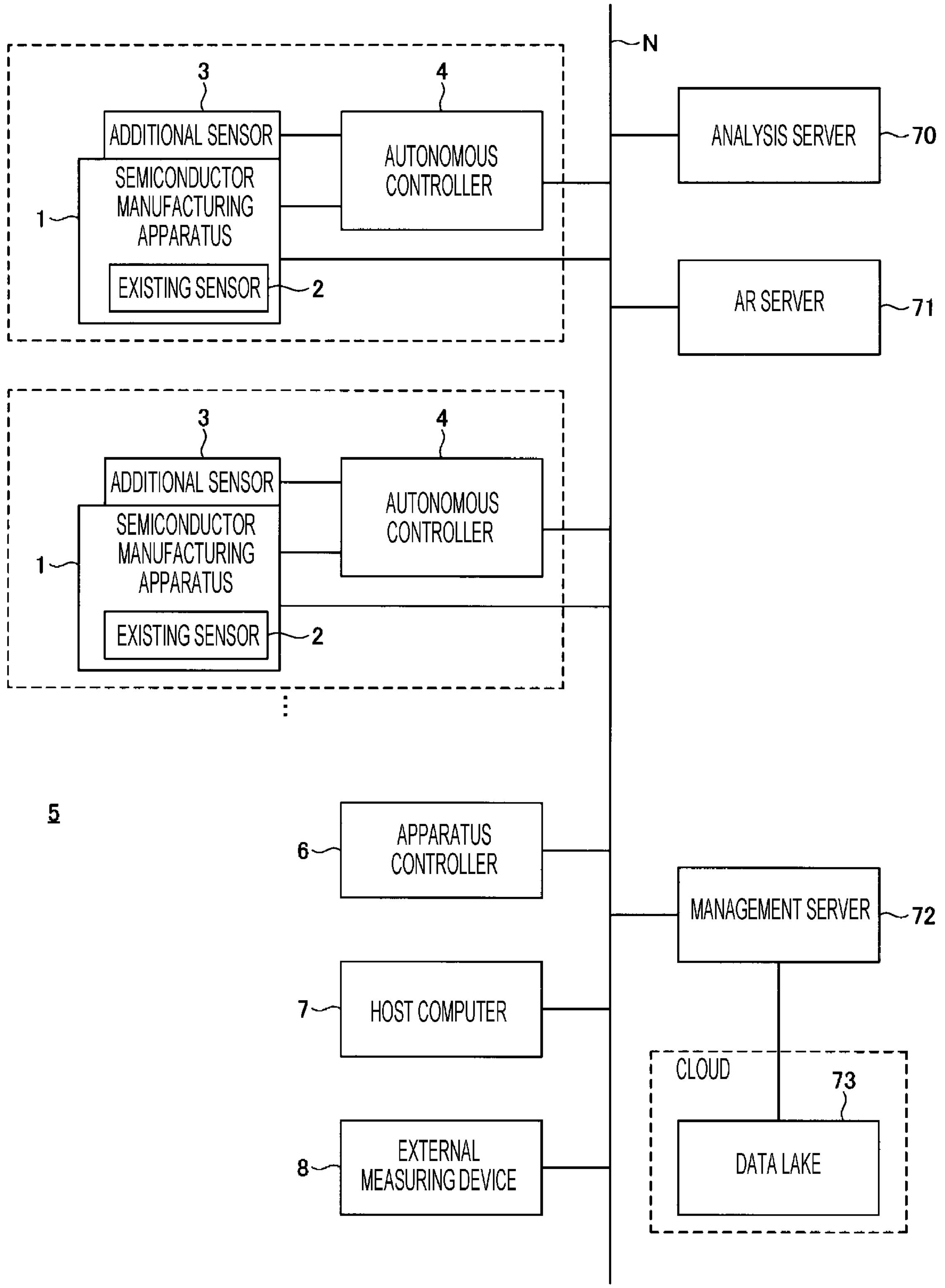
FIG. 1 is a configuration diagram of an example of an information processing system according to an embodiment.

In the following detailed description, reference is made to the accompanying drawings, which form a part thereof. The illustrative embodiments described in the detailed description, drawings, and claims are not meant to be limiting. Other embodiments may be utilized, and other changes may be made without departing from the spirit or scope of the subject matter presented here.

Hereinafter, embodiments for implementing the present disclosure will be described with reference to the accompanying drawings. In each of the drawings, the same elements may be designated by the same reference numerals and redundant descriptions may be omitted.

<System Configuration>

FIG. 1 is a configuration diagram of an example of an information processing system 5 according to the present embodiment. The information processing system 1 illustrated in FIG. 1 includes a semiconductor manufacturing apparatus 1, an existing sensor 2, an additional sensor 3, an autonomous controller 4, an apparatus controller 6, a host computer 7, an external measuring device 8, an analysis server 70, an AR server 71, a management server 72, and a data lake 73.

The semiconductor manufacturing apparatus 1, the autonomous controller 4, the apparatus controller 6, the host computer 7, the external measuring device 8, the analysis server 70, the AR server 71, and the management server 72 are connected to enable communication via a network N. An example of the network N is a local area network (LAN).

The semiconductor manufacturing apparatus 1 takes a heat treatment film forming apparatus (to be described later; see, e.g., FIG. 9) as an example, and executes a process according to process parameters under the control of the apparatus controller 6. Process parameters include the temperature in a processing container of the heat treatment film forming apparatus, the pressure in the processing container, the flow rate (concentration) of a gas supplied into the processing container, and the temperature of a gas introduced into the processing container.

The semiconductor manufacturing apparatus 1 is mounted with a plurality of existing sensors 2. The existing sensor 2 is an example of a physical sensor that measures the temperature in the processing container of the heat treatment film forming apparatus, the pressure in the processing container, and the flow rate of the gas supplied into the processing container as physical sensor data. The additional sensor 3 is an example of a physical sensor mounted for confirming the accuracy of the virtual sensor data (to be described later). The virtual sensor data is calculated based on the simulation model (physical model) (to be described later). Since the additional sensor 3 is mounted to confirm the accuracy of the virtual sensor data calculated based on the simulation model, the additional sensor 3 does not have to be mounted in the final product shipped to the customer. The additional sensor 3 measures the temperature or pressure as physical sensor data.

The temperature inside the processing container is controlled by a heater disposed in the processing container or a heater wound around a gas pipe. However, the heater wound around a gas inlet pipe may not directly measure the temperature of the gas in the pipe. Further, in the recent low temperature process, since the power value of the heater is large, heating by the heater has an influence such as deterioration of a film quality. For this reason, in order to reduce a heat load (thermal budget) in the processing container and reduce an influence on the low temperature process, it may be desired to control the temperature in the processing container without using the heater in the processing container. Therefore, in the present disclosure, the temperature of the gas introduced into the processing container is changed by providing a temperature sensor for measuring the temperature of the gas introduced into the semiconductor manufacturing apparatus 1, and directly controlling the temperature of the gas by the heater provided in the gas pipe based on the measured temperature of the gas. The temperature sensor that measures the temperature of the gas in the gas pipe is an example of the additional sensor 3.

The autonomous controller 4 is a controller for autonomously controlling the semiconductor manufacturing apparatus 1, and as described later, simulates the process state being executed in the semiconductor manufacturing apparatus 1 using a simulation model, and optimizes process parameters. The autonomous controller 4 is provided for each semiconductor manufacturing apparatus 1. By executing a simulation using the simulation model (to be described later), the autonomous controller 4 calculates the state of film adhesion on the wafer (the film shape, the film formation rate, etc.) and the state such as the temperature of the wafer, the gas, the plasma density, or the temperature of plasma electron as the results after executing the process according to the process parameters. The data (virtual data) calculated by executing the simulation using the simulation model (to be described later) includes virtual sensor data and virtual process result data. The virtual sensor data is data output from a virtual sensor. The virtual process result data is data other than the virtual sensor data among the data included in the virtual data.

Figure 9:
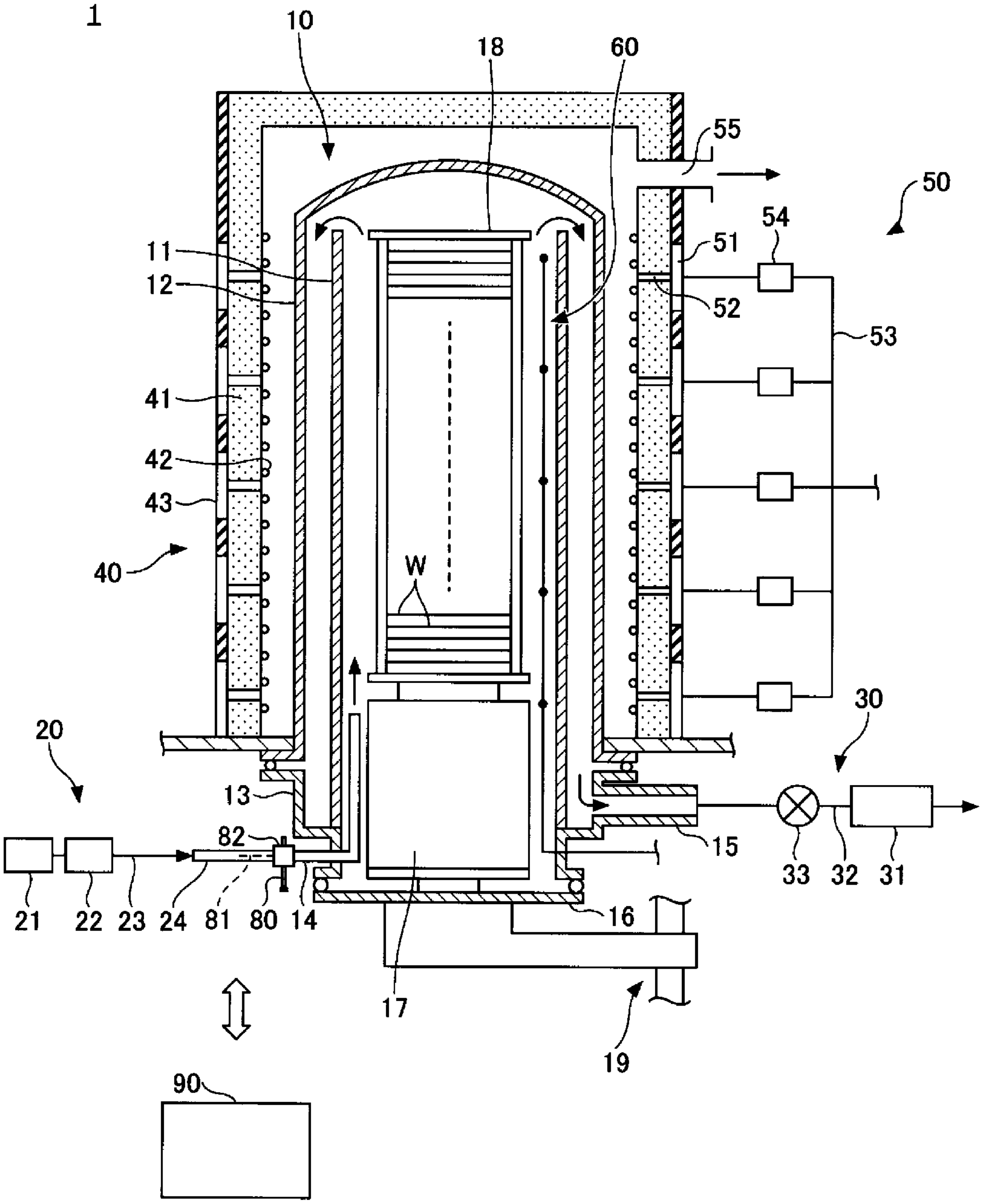
FIG. 9 is a schematic diagram of an example of a semiconductor manufacturing apparatus according to the embodiment.

The apparatus controller 6 is a controller having a computer configuration for controlling the semiconductor manufacturing apparatus 1. The apparatus controller 6 outputs optimized process parameters (to be described later) to the semiconductor manufacturing apparatus 1 as process parameters for controlling the control components of the semiconductor manufacturing apparatus 1. The apparatus controller 6 controls the process executed for each semiconductor manufacturing apparatus 1 in cooperation with the control unit 90 of FIG. 9 provided for each semiconductor manufacturing apparatus 1.

The host computer 7 is an example of a man-machine interface (MMI) that receives an instruction for the semiconductor manufacturing apparatus 1 from an operator and provides information on the semiconductor manufacturing apparatus 1 to the operator.

The external measuring device 8 is a measuring device such as a film thickness measuring device, a sheet resistance measuring device, and a particle measuring device that measures the result after execution of the process according to the process parameters. For example, the external measuring device 8 measures the state of film adhesion on a wafer such as a monitor wafer. Hereinafter, the data measured by the external measuring device 8 will be referred to as physical process result data.

As will be described later, the analysis server 70 updates the simulation model, analyzes data for optimizing process parameters, and analyzes data for failure pre-detection and maintenance time pre-detection as necessary. The AR server 71 uses the augmented reality (AR) technology to display a screen of a simulation result of a process state being executed in the semiconductor manufacturing apparatus 1 and a screen for work support such as maintenance.

The management server 72 manages, for example, information on a plurality of semiconductor manufacturing apparatuses 1 of one or more companies stored in a data storage area such as a data lake 73. The information on the plurality of semiconductor manufacturing apparatuses 1 includes process parameters in which the process is executed in the semiconductor manufacturing apparatus 1, physical sensor data when the process is executed according to the process parameters, and physical process result data. By editing the simulation model as described later based on the information on the plurality of semiconductor manufacturing apparatuses 1, a base simulation model may be edited (corrected) based on the behavior of the plurality of semiconductor manufacturing apparatuses 1. The base of the simulation model is the greatest common divisor model based on the plurality of semiconductor manufacturing apparatuses 1.

The base of the simulation model is edited to be suitable for each semiconductor manufacturing apparatus 1 by, for example, deep learning. The editing is executed, for example, every time the semiconductor manufacturing apparatus 1 is operated, and as the semiconductor manufacturing apparatus 1 is operated more frequently, the prediction accuracy of the simulation model in each semiconductor manufacturing apparatus 1 becomes higher.

The information processing system 1 in FIG. 1 is an example, and it is needless to say that there are various system configurations depending on the usage and purpose. The classification of devices such as the semiconductor manufacturing apparatus 1, the autonomous controller 4, the apparatus controller 6, the host computer 7, the external measuring device 8, the analysis server 70, the AR server 71, and the management server 72 in FIG. 1 is an example.

For example, the information processing system 5 may have a configuration in which at least two of the semiconductor manufacturing apparatus 1, the autonomous controller 4, the apparatus controller 6, the host computer 7, the external measuring device 8, the analysis server 70, the AR server, and the management server 72 are integrated. Further, a configuration in which these parts are divided may be provided, and various configurations are possible. The analysis server 70 and the AR server 71 may collectively handle a plurality of semiconductor manufacturing apparatuses 1 as in the information processing system 5 of FIG. 1, or may be provided one-to-one with the semiconductor manufacturing apparatus 1. The analysis server 70 and the AR server 71 provided one-to-one with the semiconductor manufacturing apparatus 10 may perform a process specialized for the corresponding semiconductor manufacturing apparatus 10.

<Hardware Configuration>

Figure 2:
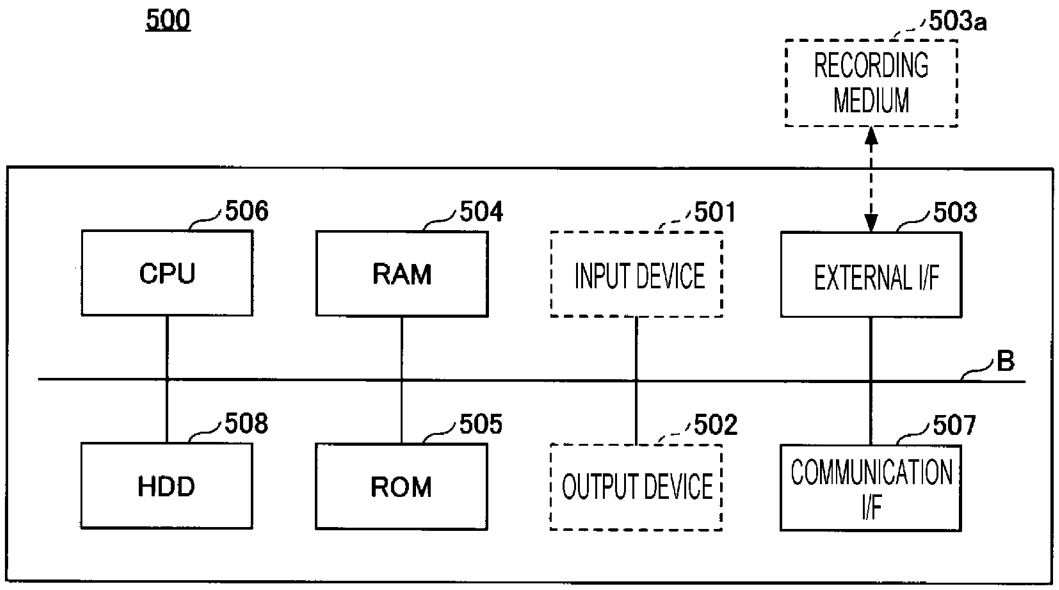
FIG. 2 is a hardware configuration diagram of an example of a computer.

The autonomous controller 4, the apparatus controller 6, the host computer 7, the analysis server 70, the AR server 71, and the management server 72 of the information processing system 1 illustrated in FIG. 1 are implemented by, for example, a computer having a hardware configuration as illustrated in FIG. 2. FIG. 2 is a hardware configuration diagram of an example of a computer.

A computer 500 of FIG. 2 includes an input apparatus 501, an output apparatus 502, an external interface (I/F) 503, a random access memory (RAM) 504, a read only memory (ROM) 505, a central processing unit (CPU) 506, a communication I/F 507, and a hard disk drive (HDD) 508, and the respective elements are connected to each other via a bus B. The input apparatus 501 and the output apparatus 502 may be connected and used when necessary.

The input apparatus 501 is a keyboard, a mouse, or a touch panel, and is used by an operator to input each operation signal. The output apparatus 502 is, for example, a display, and displays the processing result obtained by the computer 500. The communication I/F 507 is an interface for connecting the computer 500 to the network. The HDD 508 is an example of a non-volatile storage device that stores a program and data.

The external I/F 503 is an interface with an external apparatus. The computer 500 may read and/or write to a recording medium 503*a* such as a secure digital (SD) memory card via the external I/F 503. The ROM 505 is an example of a non-volatile semiconductor memory (storage device) in which programs and data are stored. The RAM 504 is an example of a volatile semiconductor memory (storage device) in which a program and data are temporarily held.

The CPU 506 is an arithmetic unit that implements the control and functions of the entire computer 500 by reading a program or data from a storage device such as the ROM 505 or the HDD 508 onto the RAM 504 and executing the process.

The autonomous controller 4, the apparatus controller 6, the host computer 7, the analysis server 70, the AR server 71, and the management server 72 of FIG. 1 may implement various functions by the hardware configuration of the computer in FIG. 2.

<Functional Configuration>

Figure 3:
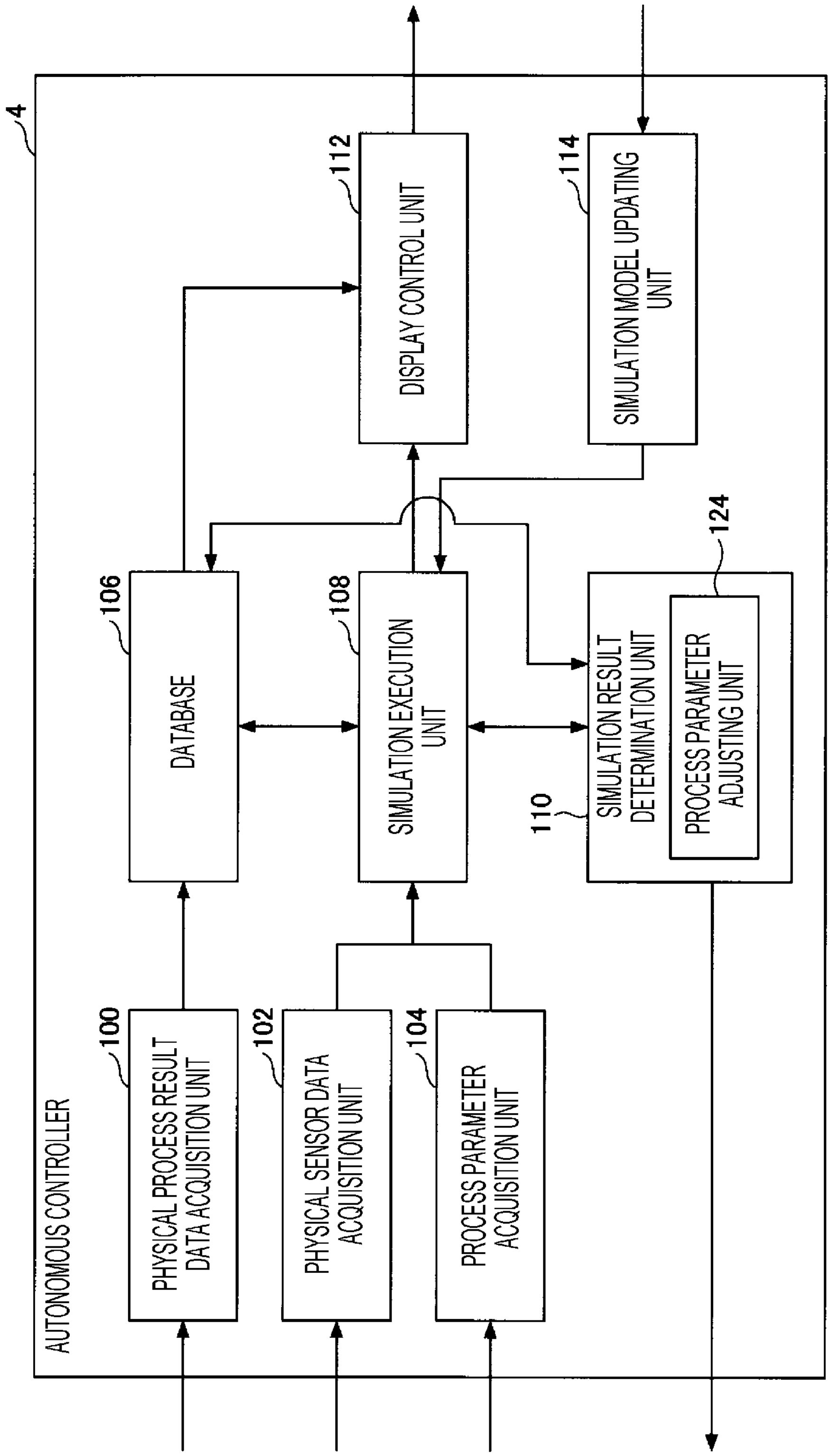
FIG. 3 is a functional block diagram of an example of an autonomous controller according to the embodiment.

The autonomous controller 4 of the information processing system 5 according to the present embodiment is implemented by, for example, the functional block of FIG. 3. FIG. 3 is a functional block diagram of an example of the autonomous controller according to the present embodiment. Further, the functional block diagram of FIG. 3 omits the illustration of a configuration unnecessary for the description of the present embodiment.

By executing a program for the autonomous controller 4, the autonomous controller 4 implements a physical process result data acquisition unit 100, a physical sensor data acquisition unit 102, a process parameter acquisition unit 104, a database 106, a simulation execution unit 108, a simulation result determination unit 110, a display control unit 112, and a simulation model updating unit 114. Further, the simulation result determination unit 110 includes a process parameter adjusting unit 124.

The physical process result data acquisition unit 100 acquires the physical process result data which is a result after executing the process according to the process parameters, and stores such data in the database 106.

The physical sensor data acquisition unit 102 acquires the physical sensor data measured by the existing sensor 2 and the additional sensor 3 and provides the acquired data to the simulation execution unit 108. The physical sensor data acquired by the physical sensor data acquisition unit 102 includes the temperature of the gas introduced into the semiconductor manufacturing apparatus 1 in which the process is executed. The process parameter acquisition unit 104 acquires the process parameters of the process being executed by the semiconductor manufacturing apparatus 1 and provides the acquired process parameters to the simulation execution unit 108. The database 106 is a data storage area in which the data used by the simulation execution unit 108 for simulation, and the data used by the analysis server 70 for updating the simulation model and analyzing data are stored.

The simulation execution unit 108 may execute the simulation by the simulation model according to the same process parameters as the semiconductor manufacturing apparatus 1 that executes the process, thereby calculating the process state of the semiconductor manufacturing apparatus 1 that executes the process For example, a simulation model of 1DCAE may be used as the simulation model of the semiconductor manufacturing apparatus 1 used by the simulation execution unit 108 for the simulation. The simulation model of 1DCAE enables an evaluation analysis before the structural design (3DCAE) by expressing the entire semiconductor manufacturing apparatus 1 on a function basis in the functional design which is an upstream design.

The simulation result determination unit 110 uses the physical process result data, physical sensor data, virtual process result data, and virtual sensor data based on the same process parameters to optimize the process parameters by the process parameter adjusting unit 124 as described later.

The display control unit 112 uses the virtual process result data and the virtual sensor data by the simulation executed according to the same process parameters as the semiconductor manufacturing apparatus 1 while executing the process by the semiconductor manufacturing apparatus 1, thereby visualizing the process state of the semiconductor manufacturing apparatus 1 executing the process in real time and displaying the process state on, for example, the host computer 7.

Therefore, the display control unit 112 may implement a so-called digital twin that reproduces a change in the physical space of the process state of the semiconductor manufacturing apparatus 1 executing the process in the virtual (cyber) space with real-time interlocking. In the digital twin, the process state of the semiconductor manufacturing apparatus 1 may be reproduced in real time in the virtual space while the process is executed by the semiconductor manufacturing apparatus 1. The autonomous controller is an example of an information processing apparatus that executes a digital twin operation that reproduces the process state of the semiconductor manufacturing apparatus 1 in real time in the virtual space while executing the process by the semiconductor manufacturing apparatus 1.

By using such a digital twin environment, the simulation result determination unit 110 may monitor the process state of the semiconductor manufacturing apparatus 1. Before using the digital twin technology, the process characteristics obtained as a result of executing the process by the semiconductor manufacturing apparatus 1 under certain parameter conditions, such as the film thickness, refractive index (RI), film formation rate, and etching rate, are measured, and the parameters are adjusted to execute the next process based on the measurement results. When the digital twin technology is used, process management may be facilitated by actual experiments conducted based on optimized simulation models. As an example, it becomes possible to adjust parameters and accelerate recipe development, reduce the number of physical sensors disposed in the semiconductor manufacturing apparatus 1 during mass production by replacing physical sensors with virtual sensors, and optimize output and yield during mass production. In addition, the process parameters (to be described later) may be adjusted. Failure pre-detection, maintenance time pre-detection, etc. are also possible.

The process management may be facilitated by actual experiments conducted based on optimized simulation models. In particular, in the present embodiment, the temperature of the gas in a gas inlet pipe 24 may be measured by a temperature sensor 80 that penetrates a joint 82 connected to the gas inlet pipe 24. The temperature sensor 80 transmits the measured temperature to the control unit 90. A second heater 81 is disposed in the gas inlet pipe 24, and the second heater 81 is configured to heat the gas in the gas inlet pipe 24. The control unit 90 controls the second heater 81 so that the gas in the pipe reaches a desired temperature based on the temperature measured by the temperature sensor 80. Thus, a simulation model is constructed to include the temperature of the gas introduced into the semiconductor manufacturing apparatus in process parameters. As a result, the process management may be facilitated by actual experiments based on simulation models that include the temperature of the gas in the process parameters.

The simulation model updating unit 114 updates the simulation model used by the simulation execution unit 108 for simulating the process state to the simulation model edited by the analysis server 70.

Figure 4:
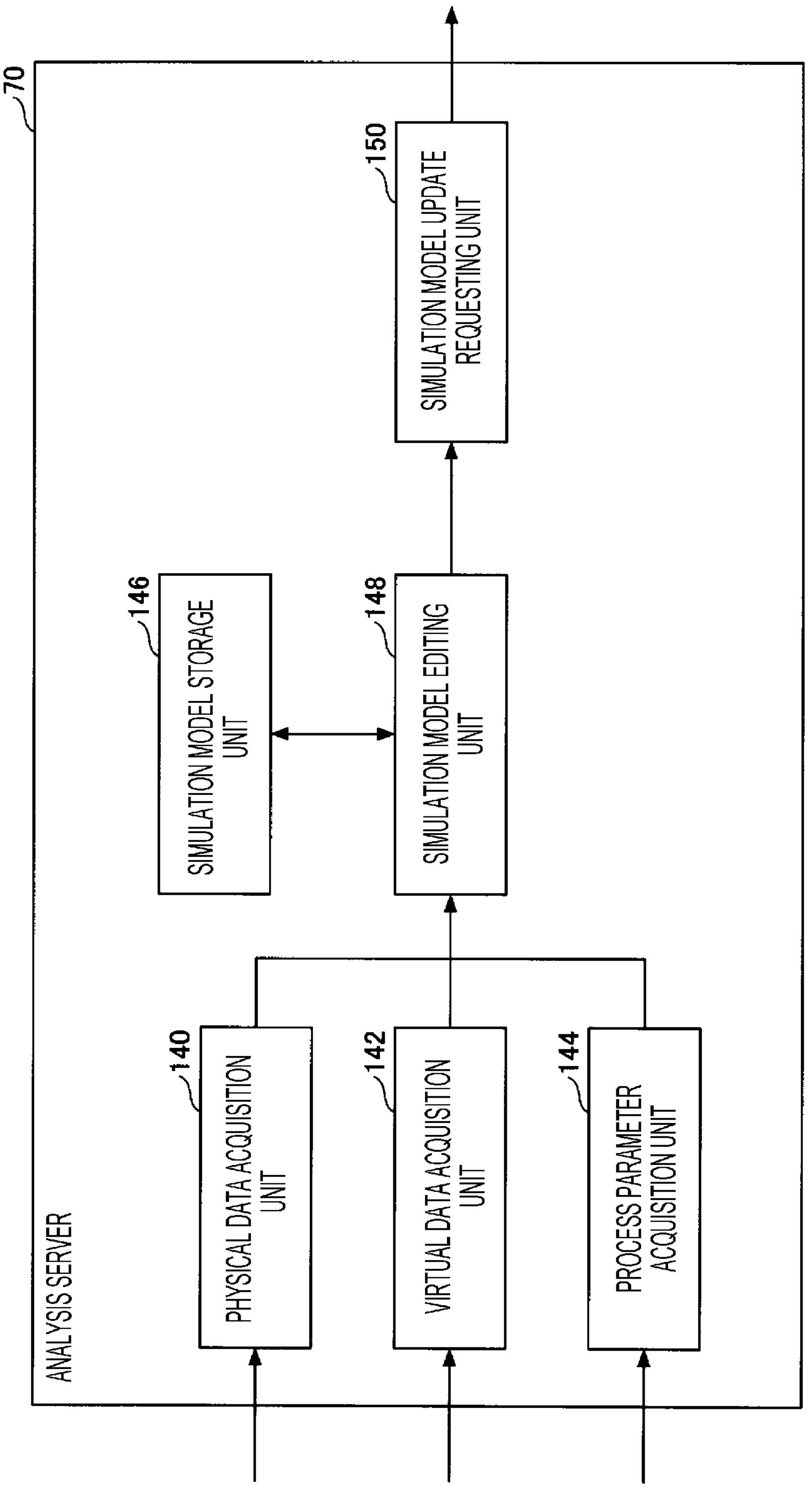
FIG. 4 is a functional block diagram of an example of an analysis server according to the embodiment.

The analysis server 70 illustrated in FIG. 1 is implemented by, for example, the functional block of FIG. 4. FIG. 4 is a functional block diagram of an example of the analysis server according to the present embodiment. The functional block diagram of FIG. 4 omits the illustration of a configuration unnecessary for the description of the present embodiment.

By executing a program for the analysis server 70, the analysis server 70 implements a physical data acquisition unit 140, a virtual data acquisition unit 142, a process parameter acquisition unit 144, a simulation model storage unit 146, a simulation model editing unit 148, and a simulation model update requesting unit 150.

The physical data acquisition unit 140 acquires the physical sensor data and the physical process result data of the semiconductor manufacturing apparatus 1 to be analyzed from the autonomous controller 4 or the management server 72 as physical data, and provides such data to the simulation model editing unit 148.

The virtual data acquisition unit 142 acquires the virtual sensor data and the virtual process result data of the semiconductor manufacturing apparatus 1 to be analyzed from the autonomous controller 4 or the management server 72 as virtual (cyber) data, and provides such data to the simulation model editing unit 148.

The process parameter acquisition unit 144 acquires the process parameters of the semiconductor manufacturing apparatus 1 to be analyzed from the autonomous controller 4 or the management server 72, and provides such parameters to the simulation model editing unit 148.

The simulation model storage unit 146 stores a simulation model for use by the simulation execution unit 108 of the autonomous controller 4 to simulate the process state of the semiconductor manufacturing apparatus 1. The simulation model editing unit 148 edits the simulation model by using the provided physical data, virtual data, and process parameters, for example, by using machine learning so that a difference between the physical data and the virtual data due to the same process parameters becomes smaller (becomes the optimum simulation model). Editing the simulation model does not necessarily have to be performed during normal operation of the semiconductor manufacturing apparatus 1, and may be performed, for example, when a physical specification change is made to the semiconductor manufacturing apparatus 1 to be simulated. The simulation model update requesting unit 150 requests the autonomous controller 4 to update the edited simulation model.

<Process>

In the information processing system 5 according to the present embodiment, a simulation model edited by, for example, machine learning is used so that a difference between the physical data of the semiconductor manufacturing apparatus 1 that executes the process according to the process parameters and the virtual data of the simulation executed according to the same process parameters as the semiconductor manufacturing apparatus 1 becomes smaller.

For editing the simulation model, the physical sensor data acquisition unit 102 acquires the physical sensor data measured by the semiconductor manufacturing apparatus 1 that executes the process according to the process parameters. The simulation execution unit 108 executes a simulation by a simulation model according to the process parameters including physical sensor data, and calculates virtual sensor data and virtual process result data. The simulation execution unit 108 edits the simulation model by, for example, machine learning so that a difference between the acquired physical data and the virtual data of the simulation executed according to the same process parameters as the semiconductor manufacturing apparatus 1 becomes smaller. In the present disclosure, the simulation model editing unit 148 has been described based on the function of the analysis server 70, but may have the function of the autonomous controller 4.

By using such a simulation model, the information processing system 5 according to the present embodiment ensures the accuracy of the simulation result obtained by using the simulation model executed by the simulation execution unit 108. Further, the simulation model may be edited according to the elapsed time from the previous editing, the number of process executions, the expansion of a difference between the physical data and the virtual data according to the same process parameters.

«Process Execution»

Figure 5:
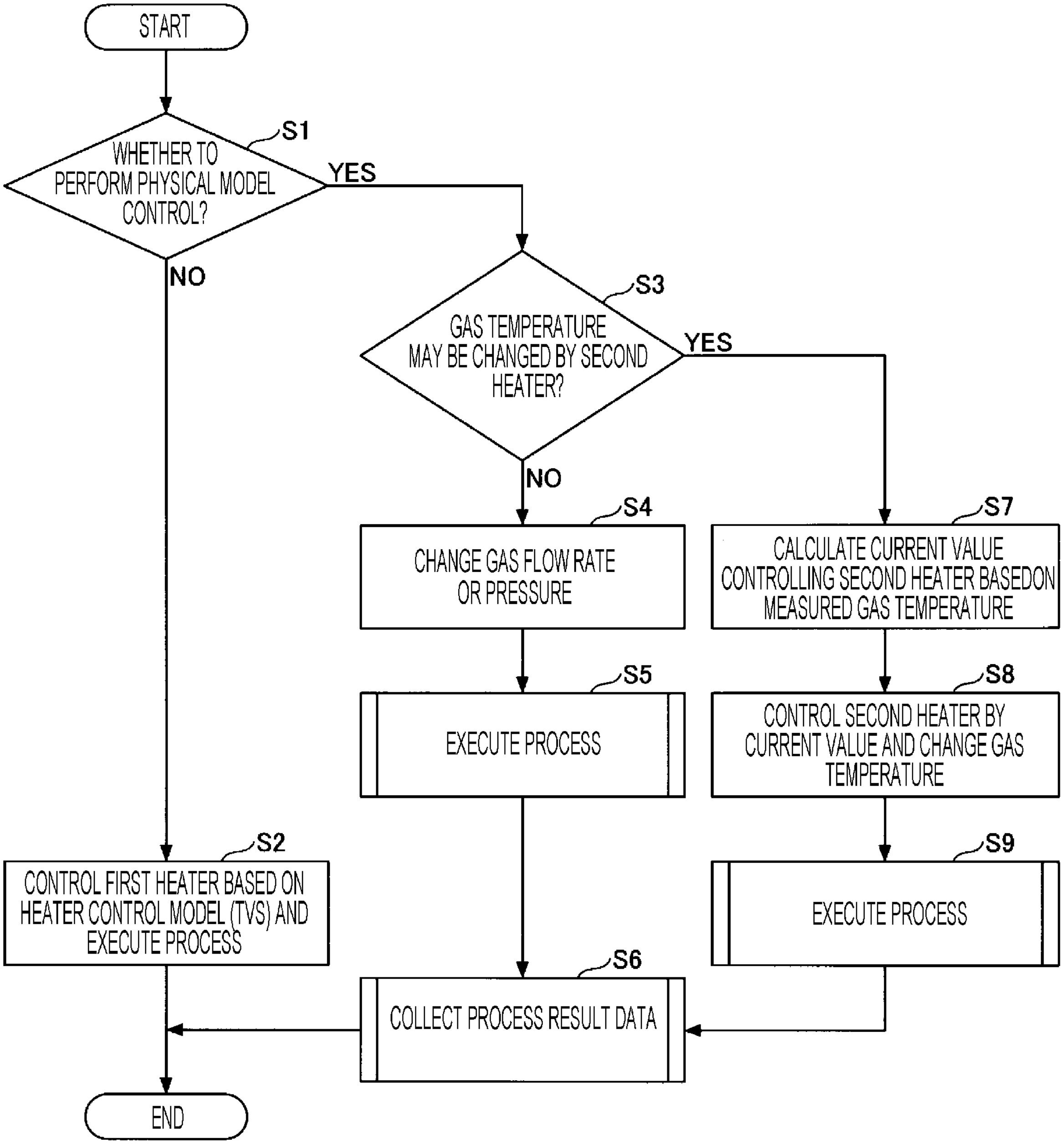
FIG. 5 is a flowchart of a process of the information processing system according to the embodiment.
Figure 6:
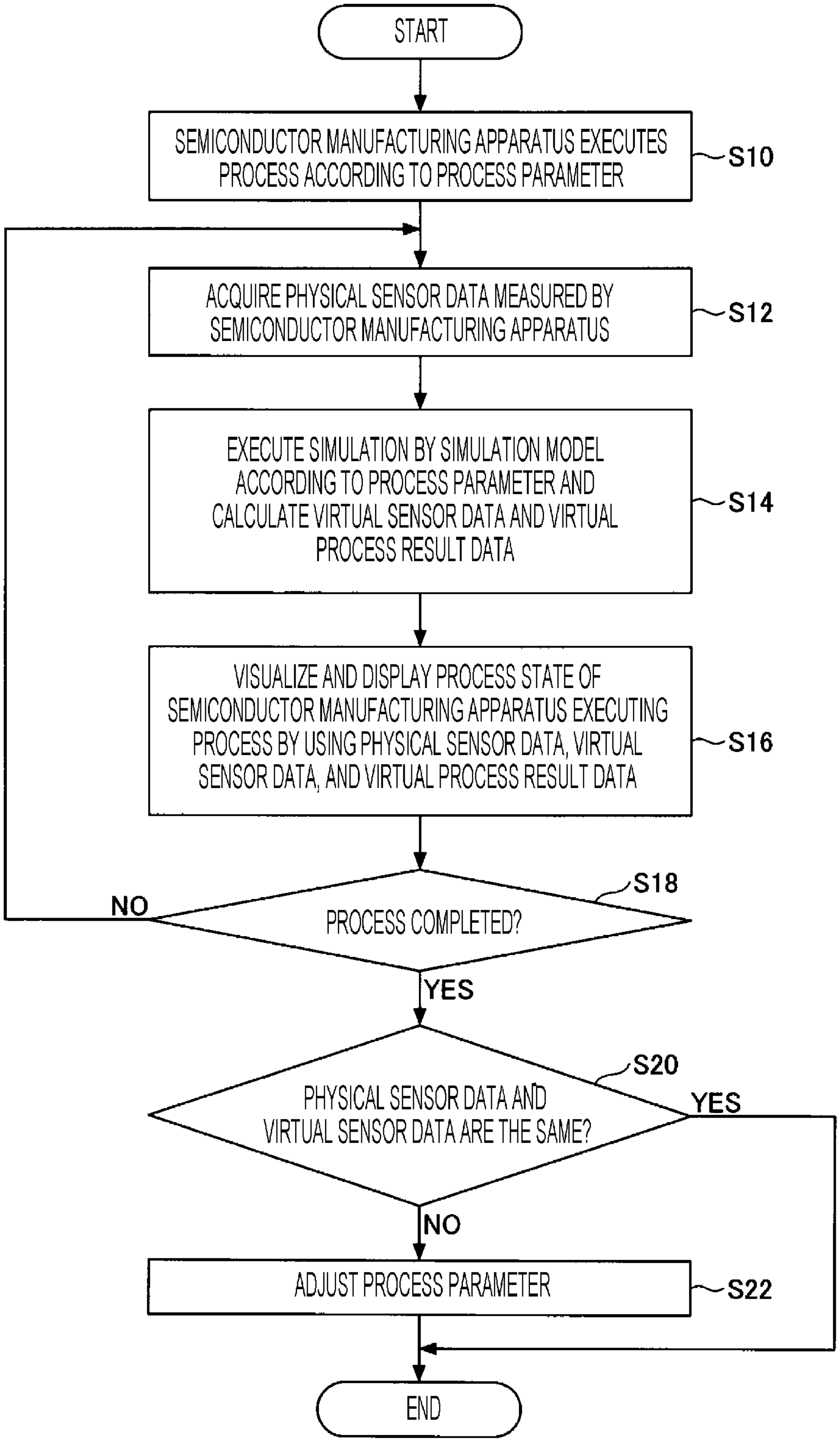
FIG. 6 is a flowchart illustrating an example of a process execution included in the process of FIG. 5.

Next, a process of the information processing system 5 according to the embodiment will be described with reference to FIG. 5. FIG. 5 is a flowchart of the process of the information processing system 5 according to the embodiment. FIG. 6 is a flowchart illustrating an example of a process execution (digital twin) included in the process of FIG. 5. The process execution of FIG. 6 is controlled by the apparatus controller 6, and includes the physical process executed by the semiconductor manufacturing apparatus 1 according to process parameters, and the virtual process executed by the autonomous controller 4 using physical sensor data, virtual sensor data, and virtual process result data.

Every time the semiconductor manufacturing apparatus 1 executes a process in advance, physical process result data, physical sensor data, virtual process result data, and virtual sensor data, which are the results after executing the process according to the process parameters, are collected and stored in the database 106.

When the process of FIG. 5 is started, the apparatus controller 6 determines in step S1 whether to perform a physical model control. Hereinafter, a heater disposed in the processing container and/or a heater wound around the outer circumference of a gas pipe is collectively referred to as a first heater. Further, a heater provided in the gas pipe and controlling the temperature of the gas flowing in the gas pipe is referred to as a second heater. The first heater indirectly controls the temperature of the gas in the processing container or the gas pipe by controlling the temperature of the gas in the processing container of the semiconductor manufacturing apparatus 1 or heating the gas pipe. The second heater is provided in the gas pipe and directly controls the temperature of the gas in the gas pipe.

When the temperature in the processing container rises to about 600° C. due to heating by the first heater because the power value of the first heater is large, in the case of the low temperature process, the deterioration of the film is affected. For this reason, it may be desired to control the temperature of the gas supplied into the processing container without using the first heater in order to reduce the heat load (thermal budget) in the processing container and suppress the influence on the low temperature process. For example, when the temperature of the gas is directly controlled by using the second heater, the inside of the processing container may be heated or cooled by the controlled temperature of the gas. According to such a control, by directly controlling the temperature of the gas by the process, it is possible to cope with the case where the temperature in the processing container is not desired to be high, whereby the heat load (thermal budget) inside the processing container may be reduced. As a result, high-quality film formation or other wafer process may be implemented in any process such as a low temperature process.

The determination of "whether to perform a physical model control" in step S1 is made based on the preset setting information. However, the present disclosure is not limited thereto. When the simulation is performed in advance or when a discrimination is made from the measurement data related to the film characteristics such as the thickness and RI of the film formed under the control by a heater control model (TVS) (to be described later) and the process result is determined to be not good by the control by the heater control model, the process may automatically transition to step S3.

When it is determined that the physical model control is not performed, the apparatus controller 6 determines "NO" in step S1 and proceeds to step S2. In step S2, the apparatus controller 6 controls the first heater, executes the process according to the heater control model, ends the process execution, and then ends the present process. In the control based on the heater control model, the first heater is controlled, and the heat treatment is performed by supplying the processing gas while raising or lowering the temperature of a substrate W. For example, when the heat treatment is performed while raising the temperature of the substrate W, after the first heater is controlled so that the temperature of the periphery of the substrate W becomes higher than the temperature of the center by a predetermined amount, the processing gas is supplied and the film formation is started. Meanwhile, for example, when the heat treatment is performed while raising the temperature of the substrate W, after the first heater is controlled so that the temperature of the center of the substrate W becomes higher than the temperature of the periphery by a predetermined amount, the processing gas is supplied and the film formation is started.

When it is determined that the physical model control is performed, the apparatus controller 6 determines "YES" in step S1 and proceeds to step S3. In step S3, the apparatus controller 6 determines whether the temperature of the gas may be changed by the second heater in the gas pipe. An operator may select whether to change the temperature of the gas, or the apparatus controller 6 may automatically select whether to change the temperature of the gas. For example, when the second heater is not provided in the gas pipe, since the operator or the apparatus controller 6 may not change the temperature of the gas in the gas pipe, the determination result is "NO" in step S3.

Further, when correlation data between the temperature of the gas in the gas pipe and the film shape of the process result is obtained by the simulation of the present disclosure, and when it is determined that the desired film shape is not obtained by controlling the temperature of the gas by the second heater based on the correlation data, the operator or the apparatus controller 6 determines "NO" in step S3 and proceeds to step S4. When it is determined that the desired film shape is obtained by controlling the temperature of the gas by the second heater, the operator or the apparatus controller 6 determines "YES" in step S3 and proceeds to step S7.

In step S4, the apparatus controller 6 changes the flow rate of the gas or the pressure in the processing container among the process parameters. In step S4, the apparatus controller 6 may change both the flow rate of the gas and the pressure in the processing container.

In step S5, the semiconductor manufacturing apparatus 1 executes the process based on the conditions of the process parameters including the changed flow rate of the gas or the changed pressure in the processing container. The process of step S5 is a digital twin that reproduces a virtual process in which the process state of the semiconductor manufacturing apparatus 1 is set in real time in a virtual space while the process is executed by the semiconductor manufacturing apparatus 1. The apparatus controller 6 controls the process by the semiconductor manufacturing apparatus 1 according to the process parameters. The autonomous controller 4 determines a process parameter serving as virtual process result data that approximates the physical process result data designated by the user, and controls the virtual process according to the simulation model. The details of the digital twin process executed in step S5 will be described later with reference to FIG. 6.

When the execution of the process ends in step S5, the process proceeds to step S6. Then, the apparatus controller 6 and the autonomous controller 4 collect (store) physical sensor data, physical process result data, virtual sensor data, and virtual process result data in the database 106, and end the present process.

In step S7, the apparatus controller 6 acquires the temperature of the gas measured by the temperature sensor 80 having a temperature measuring unit in the gas pipe, and calculates the current value to be supplied to the second heater based on the acquired temperature of the gas. For example, the current value supplied to the second heater 81 is calculated to be the physical process result data (process result data having a film shape desired by the user, etc.) designated by the user.

In step S8, the apparatus controller 6 supplies the calculated current value to the second heater. As a result, the temperature on the wafer may be controlled by controlling the temperature of the gas introduced into the processing container of the semiconductor manufacturing apparatus 1 from the gas pipe (e.g., the gas inlet pipe 24 in FIG. 9) to a desired temperature. Therefore, the process of the film shape requested by the user may be implemented.

In step S9, the semiconductor manufacturing apparatus 1 executes the process based on the conditions of the process parameters including the changed gas temperature. The process of step S9 is a physical model control using the twin technology for reproducing a virtual process in which the process state of the semiconductor manufacturing apparatus 1 is set in real time in a virtual space while the process is executed by the semiconductor manufacturing apparatus 1. The apparatus controller 6 controls the process by the semiconductor manufacturing apparatus 1 according to the process parameters. The autonomous controller 4 controls the virtual process according to the simulation model. The apparatus controller 6 controls the process by the semiconductor manufacturing apparatus 1 according to the process parameters. The autonomous controller 4 determines a process parameter serving as virtual process result data that approximates the physical process result data designated by the user, and controls the virtual process according to the simulation model. The details of the digital twin process executed in step S9 will be described later with reference to FIG. 6.

When the execution of the process ends in step S9, the process proceeds to step S6. Then, the apparatus controller 6 and the autonomous controller 4 collect (store) physical sensor data, physical process result data, virtual sensor data, and virtual process result data in the database 106, and end the present process.

Next, the details of the process execution of step S5 and step S9 will be described with reference to FIG. 6. The present process is called from step S5 or step S9 and is started.

In step S10, the semiconductor manufacturing apparatus 1 executes the process according to the process parameters output from the apparatus controller 6. In the process called and executed from step S5 of FIG. 5, the process parameters do not include the temperature of the gas. In the process called and executed from step S9, the process parameters include the temperature of the gas. In step S12, the autonomous controller 4 acquires the physical sensor data measured by the existing sensor 2 and the additional sensor 12 from the semiconductor manufacturing apparatus 1 that executes the process. For example, in the process of step S9, the physical sensor data measured by the temperature sensor that measures the temperature of the gas is acquired.

In step S14, the simulation execution unit 108 of the autonomous controller 4 executes a simulation by the simulation model according to the same process parameters as the semiconductor manufacturing apparatus 1 that executes the process, and calculates virtual sensor data and virtual process result data.

Figure 7:
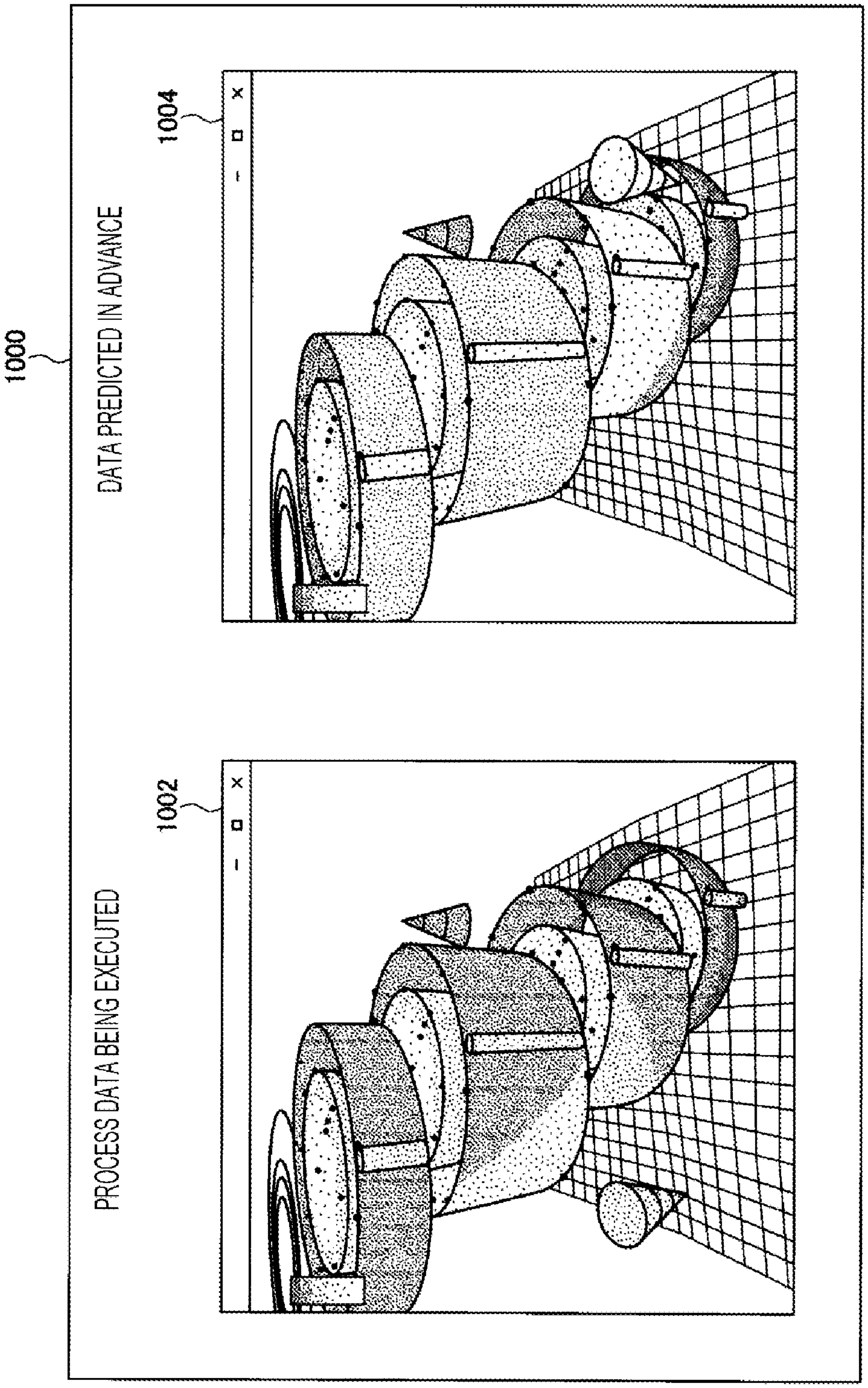
FIG. 7 is an image diagram of an example of a temperature evaluation screen.

In step S16, the display control unit 112 of the autonomous controller 4 may visualize the process state of the semiconductor manufacturing apparatus 1 executing the process as illustrated in FIG. 7 and display the process state on the host computer 7 by using the physical sensor data of the semiconductor manufacturing apparatus 1 that executes the process, the virtual process result data by the simulation executed according to the same process parameters as the semiconductor manufacturing apparatus 1, and the virtual sensor data.

The process state of the semiconductor manufacturing apparatus 5 may be visualized and displayed on the display unit during the execution of the process by using the physical sensor data, the virtual sensor data, and the virtual process result data. The process state of the semiconductor manufacturing apparatus 5 based on the virtual process result data and the process status of the semiconductor manufacturing apparatus 5 based on the physical process result data after executing the process according to the process parameters may be displayed in a comparable form.

When the process state of the semiconductor manufacturing apparatus 5 is visualized and displayed on the display unit, the measurement points of the physical sensor data and the measurement points of the virtual sensor data may be visualized and displayed on the display unit. In the present disclosure, it is possible to virtualize the temperature control of the gas and implement the visualization of the gas in the gas pipe.

FIG. 7 is an image diagram of an example of a temperature evaluation screen. A temperature evaluation screen 1000 of FIG. 7 is a screen example in which a temperature display screen 1002 of the process being executed and a temperature display screen 1004 predicted in advance before the execution of the process are displayed at the same time.

The temperature evaluation screen 1000 in FIG. 7 is an example. The temperature display screen based on the result of the simulation executed according to the process parameters before optimization and the temperature display screen based on the result of the simulation executed according to the process parameters after optimization may be displayed at the same time. As a result, the operator may confirm the degree of improvement by optimizing the process parameters. Further, the temperature evaluation screen 1000 of FIG. 7 may be a screen in which the temperature display screen of the process being executed and the predicted future temperature display screen are displayed at the same time.

The temperature display screens 1002 and 1004 of FIG. 7 display the temperature, virtual air flow, and convection of the respective parts such as a wafer, an inner pipe, an outer pipe, an inner temperature sensor, an outer temperature sensor, and a temperature sensor that measures the temperature of a gas. The temperature display screens 1002 and 1004 of FIG. 7 display the distribution of temperature and gas concentration in color. The temperature display screens 1002 and 1004 of FIG. 7 may be displayed at 360 degrees from various viewpoints. The temperature display screens 1002 and 1004 of FIG. 7 represent an example of screens that may be cut into round slices to display necessary parts. Further, unnecessary parts may be hidden.

The temperature display screens 1002 and 1004 of FIG. 7 display the temperature measurement points by the physical sensor or the virtual sensor with black dots. The temperature display screens 1002 and 1004 of FIG. 7 may display the temperature at a position clicked by the operator with a mouse (a position where the operator wants to know the temperature).

Referring back to step S18 of FIG. 6, the autonomous controller 4 repeats the processes of steps S12 to S16 until the process being executed by the semiconductor manufacturing apparatus 1 is completed. When the process being executed by the semiconductor manufacturing apparatus 1 is completed, the process proceeds from steps S18 to S20, and the simulation result determination unit 110 of the autonomous controller 4 compares the physical sensor data and the virtual sensor data at the same position and time. As a result of comparison, the simulation result determination unit 110 determines whether the physical sensor data and the virtual sensor data at the same position and time are the same as each other.

When it is determined that the physical sensor data and the virtual sensor data are not the same, the process parameter adjusting unit 124 of the simulation result determination unit 110 performs a process parameter adjusting process of step S22 for optimizing the process parameters so that the result after the process execution desired by the customer may be obtained.

For example, when the difference between the physical sensor data and the virtual sensor data at the same position and time exceeds a predetermined threshold value, the process parameter adjusting process of step S22 may be dealt with by stopping the optimization of the process parameters and editing the simulation model or maintaining the semiconductor manufacturing apparatus 1. This allows the simulation model to be optimized to obtain the results after the process execution desired by the customer.

The types of process parameters used in the process of step S9 and the process parameters used in the process of step S5 are different, and the simulation models used in steps S9 and S5 are also different. Therefore, the optimization of the simulation model is also performed for each simulation model.

Figure 8:
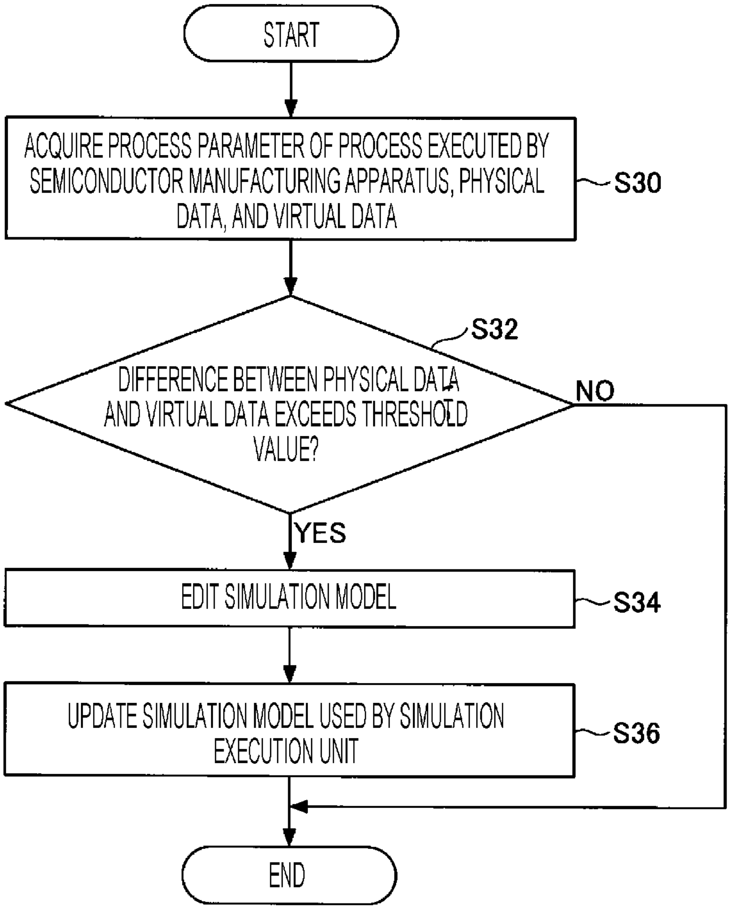
FIG. 8 is a flowchart of an example of a process for editing a simulation model.

Editing the simulation model is executed by the processing procedure, for example, as illustrated in FIG. 8. FIG. 8 is a flowchart of an example of the process of editing the simulation model. In step S30, the analysis server 70 acquires the process parameters of the process executed by the semiconductor manufacturing apparatus 1, the physical data of the semiconductor manufacturing apparatus 1, which is the result of the process according to the process parameters, and the virtual data calculated based on the simulation model.

In step S32, the simulation model editing unit 148 of the analysis server 70 determines whether the difference between the physical sensor data and the virtual sensor data at the same position and time exceeds a predetermined threshold value. When it is determined that the predetermined threshold value is not exceeded, the simulation model editing unit 148 skips the processes of steps S34 to S36.

When it is determined that the threshold value is exceeded, in step S34, the simulation model editing unit 148 edits the simulation model by using the physical data, virtual data, and process parameters acquired in step S30, for example, by using machine learning or statistical process so that the difference between the physical data and virtual data due to the same process parameters becomes smaller.

Proceeding to step S36, the simulation model update requesting unit 150 of the analysis server 70 requests the autonomous controller 4 to update the simulation model edited in step S34, so that the simulation used by the simulation execution unit 108 of the autonomous controller 4 may be updated.

Further, in the case of the base simulation model, the physical data, virtual data, and process parameters of the plurality of semiconductor manufacturing apparatuses 1 may be acquired, and the simulation model may be edited by using, for example, machine learning or statistical process.

[Semiconductor Manufacturing Apparatus]

An example of the semiconductor manufacturing apparatus 1 that executes the process described above will be described with reference to FIG. 9. The semiconductor manufacturing apparatus 1 includes a processing container 10, a gas supply unit 20, an exhausting unit 30, a heating unit 40, a cooling unit 50, a temperature sensor 60, and a control unit 90.

The processing container 10 has a substantially cylindrical shape. The processing container 10 includes an inner pipe 11, an outer pipe 12, a manifold 13, an injector 14, a gas outlet 15, and a cover 16. The inner pipe 11 has a substantially cylindrical shape. The outer pipe 12 has a substantially cylindrical shape with a ceiling, and the inner pipe 11 and the outer pipe 12 form a double pipe structure. The outer tube 12 is made of a heat-resistant material such as quartz. The inner tube 11 and the outer tube 12 are made of a heat-resistant material such as quartz.

The manifold 13 has a substantially cylindrical shape. The manifold 13 supports the lower ends of the inner pipe 11 and the outer pipe 12. The manifold 13 is made of, for example, stainless steel. The injector 14 penetrates the manifold 13 and extends horizontally into the inner pipe 11, bends in an L shape in the inner pipe 11, and extends upward. The base end of the injector 14 is connected to a gas inlet pipe 24 and the tip of the injector 14 opens. The injector 14 discharges a processing gas introduced through the gas inlet pipe 24 (hereinafter, also simply referred to as a "gas") from the opening at the tip into the inner pipe 11. There may be a plurality of injectors 14.

The gas outlet 15 is formed in the manifold 13. The processing gas is exhausted by the exhausting unit 30 via the gas outlet 15. The cover 16 airtightly closes the opening at the lower end of the manifold 13. The cover 16 is made of, for example, stainless steel. A wafer boat 18 is disposed on the cover 16 via a heat insulating cylinder 17. The heat insulating cylinder 17 and the wafer boat 18 are made of a heat-resistant material such as quartz. The wafer boat 18 holds a plurality of wafers W substantially horizontally at predetermined intervals in the vertical direction. When a lifting mechanism 19 raises the cover 16, the wafer boat 18 is loaded into the processing container 10 and accommodated therein. When the lifting mechanism 19 lowers the cover 16, the wafer boat 18 is unloaded from the processing container 10.

The gas supply unit 20 includes a gas source 21, an integrated gas system (IGS) 22, an external pipe 23, and a gas inlet pipe. 24. The gas source 21 is a supply source of the processing gas, and includes, for example, a film forming gas source, a cleaning gas source, and a purge gas source. The IGS 22 is an integrated circuit of gas pipes in which a group of pipes connected to a film forming gas source, a cleaning gas source, and a purge gas source of the gas source 21, respectively, is integrated. A flow rate controller is installed in the IGS 22 to control the flow rate of the gas flowing through each pipe. The flow rate controller includes, for example, a mass flow controller and an on/off valve.

The IGS 22 is connected to the external pipe 23. The external pipe 23 is connected to the gas inlet pipe 24. A first heater (not illustrated) is configured to be wound around the outer periphery of the external pipe 23 to heat the external pipe 23. The gas inlet pipe 24 is connected to the processing container 10 of the semiconductor manufacturing apparatus 1 and introduces gas into the processing container 10. That is, the flow rate of the processing gas from the gas source 21 is controlled by the flow rate controller in the IGS 22, when flowing through the external pipe 23, the gas is heated to flow to the gas inlet pipe 24, and is supplied from the gas inlet pipe 24 into the processing container 10 via the injector 14. The injector 14 functions as a gas inlet port of the processing container 10.

A joint 82 for a gas pipe connected to the gas inlet pipe 24 is provided in the vicinity of the gas inlet port of the processing container 10. The temperature sensor 80 is configured to penetrate the joint 82. The temperature sensor 80 is configured to measure the temperature of the gas in the gas inlet pipe 24. The temperature sensor 80 transmits the measured temperature to the control unit 90. A second heater 81 is disposed in the gas inlet pipe 24, and the second heater 81 is configured to heat the gas in the gas inlet pipe 24.

The exhausting unit 30 includes an exhaust device 31, an exhaust pipe 32, and a pressure controller 33. The exhaust device 31 is a vacuum pump such as a dry pump or a turbo molecular pump. The pressure controller 33 is interposed in the exhaust pipe 32, and controls the pressure in the processing container 10 by adjusting the conductance of the exhaust pipe 32. The pressure controller 33 is, for example, an automatic pressure control valve.

The heating unit 40 includes a heat insulating material 41, a first heater 42, and an outer skin 43. The heat insulating material 41 has a substantially cylindrical shape and is provided around the outer pipe 12. The heat insulating material 41 is formed mainly of silica and alumina. The first heater 42 has a linear shape and is provided in a spiral or meandering shape on the inner periphery of the heat insulating material 41. The first heater 42 is configured to be divided into a plurality of zones in the height direction of the processing container 10 such that the temperature may be controlled. The outer skin 43 is provided to cover the outer periphery of the heat insulating material 41. The outer skin 43 retains the shape of the heat insulating material 41 and reinforces the heat insulating material 41. The outer skin 43 is formed of a metal such as stainless steel. Further, in order to suppress the influence of heat on the outside of the heating unit 40, a water-cooled jacket (not illustrated) may be provided on the outer periphery of the outer skin 43. The heating unit 40 heats the inside of the processing container 10 when the first heater 42 generates heat.

The cooling unit 50 supplies a cooling fluid toward the processing container 10 to cool the wafer W in the processing container 10. The cooling fluid may be, for example, air. The cooling unit 50 supplies a cooling fluid toward the processing container 10, for example, when the wafer W is rapidly lowered in temperature after heat treatment. Further, the cooling unit 50 supplies the cooling fluid toward the inside of the processing container 10, for example, at the time of cleaning for removing the deposited film in the processing container 10. The cooling unit 50 includes a fluid flow path 51, a blowout hole 52, a distribution flow path 53, a flow rate regulator 54, and a heat exhaust port 55.

A plurality of fluid flow paths 51 is formed in the height direction between the heat insulating material 41 and the outer skin 43. The fluid flow path 51 is, for example, a flow path formed along the circumferential direction on the outside of the heat insulating material 41. The blowout hole 52 is formed to penetrate the heat insulating material 41 from each fluid flow path 51, and discharges the cooling fluid into the space between the outer pipe 12 and the heat insulating material 41. The distribution flow path 53 is provided outside the outer skin 43, and distributes and supplies the cooling fluid to each fluid flow path 51. The flow rate regulator 54 is interposed in the distribution flow path 53, and adjusts the flow rate of the cooling fluid supplied to the fluid flow path 51.

The heat exhaust port 55 is provided above the plurality of blowout holes 52, and discharges the cooling fluid supplied to the space between the outer pipe 12 and the heat insulating material 41 to the outside of the semiconductor manufacturing apparatus 1. The cooling fluid discharged to the outside of the semiconductor manufacturing apparatus 1 is cooled by, for example, a heat exchanger and supplied to the distribution flow path 53 again. However, the cooling fluid discharged to the outside of the semiconductor manufacturing apparatus 1 may be discharged without being reused.

The temperature sensor 60 detects the temperature inside the processing container 10. The temperature sensor 60 is provided in, for example, the inner pipe 11. However, the temperature sensor 60 may be provided at a position where the temperature inside the processing container 10 is detectable, and may be provided, for example, in the space between the inner pipe 11 and the outer pipe 12. The temperature sensor 60 includes, for example, a plurality of temperature measuring units provided at different positions in the height direction corresponding to a plurality of zones. The temperature measuring units of the temperature sensor 60 are provided corresponding to the zones of "TOP," "C-T," "CTR," "C-B," and "BTM" in order from the top. The plurality of temperature measuring units may be, for example, a thermocouple or a temperature measuring resistor. The temperature sensor 60 transmits the temperature detected by the plurality of temperature measuring units to the control unit 90.

The control unit 90 controls the process executed by the semiconductor manufacturing apparatus 1 in conjunction with the apparatus controller 6. The control unit 90 controls the operation of the semiconductor manufacturing apparatus 1. The control unit 90 may be, for example, a computer.

In the process of the semiconductor manufacturing apparatus 1 described above, the process result depends on a combination of process parameters such as the temperature in the processing container, the pressure in the processing container, the flow rate (concentration) of the gas, and the temperature of the gas.

Therefore, a temperature sensor 80 capable of directly measuring the temperature of the gas is disposed. The temperature sensor 80 is disposed in the joint 82 connected to the gas inlet pipe 24. Since the temperature sensor 80 is disposed in the gas inlet pipe 24 without the temperature measuring unit coming into contact with the gas inlet pipe 24, the temperature of the gas may be directly measured. In the processes of steps S7 to S9 of FIG. 5, as an example, the temperature of the gas introduced into the processing container 10 may be controlled by controlling the current value supplied to the second heater 81 disposed in the gas inlet pipe 24 based on the temperature of the gas measured by the temperature sensor 80. By controlling the temperature of the gas introduced into the processing container 10 of the semiconductor manufacturing apparatus 1 to a desired temperature in this way, the temperature on the wafer may be controlled, thereby implementing the process of the film shape requested by the user.

The process of the semiconductor manufacturing apparatus 1 in the related art does not have a structure for directly controlling the temperature of the gas. The semiconductor manufacturing apparatus 1 according to the present embodiment has a configuration in which the temperature sensor 80 is provided in the gas inlet pipe near the gas inlet port for introducing gas into the processing container 10 so that a temperature measuring unit does not come into contact with the pipe, and the second heater 81 is disposed in the pipe. Thus, the measurement accuracy of the temperature of the gas may be improved by directly measuring the temperature of the gas introduced into the processing container 10. Further, based on the directly measured gas temperature, the current value supplied to the second heater 81 disposed in the pipe is controlled in order to bring the gas temperature closer to the target value. Thus, the gas temperature, which is one of the process parameters, may be accurately controlled by the second heater 81 based on the measurement result of the gas temperature. As a result, it is possible to calculate, using a simulation model, how much heat on the wafer is taken away by the gas introduced into the processing container 10 during the process executed by the semiconductor manufacturing apparatus 1 using the gas temperature as physical sensor data. This makes it possible to simulate how much the gas temperature affects the wafer, such as heat generated from the wafer according to the temperature of the introduced gas, and what shape and quality of the film is formed. While operating the semiconductor manufacturing apparatus 1 using the simulation result so that a film having a desired shape is formed, it is possible to change process parameters such as the gas temperature during the process execution to form a film having an expected shape and expected film quality on the wafer.

In the simulation model, the reaction of the gas on the wafer surface with respect to the temperature of the gas may be predicted by using the reaction model of the gas formed on the wafer. Thus, the gas supplied from the injector 14 into the processing container 10 is supplied to the wafer, and the thickness of the film may be predicted based on the process parameters according to the temperature of the supplied gas. As a result, by changing the process parameters using the simulation results, it is possible to form a film having a shape requested by the user, such as a film whose center thickness is thicker than the edge thickness or a film whose edge thickness is thicker than the center thickness.

In particular, when controlling the temperature of the first heater 42 in the processing container 10, the output value of the heater is high and the heat load in the processing container 10 may not be reduced, which may have an influence such as deterioration of the film quality in the low temperature process. Due to the miniaturization of a wiring layer formed on the film on the wafer, there are cases in which the temperature in the processing container 10 is not made higher than a predetermined value in order to suppress deterioration of the film quality.

In the present disclosure, the temperature of the gas is controlled by the second heater in the gas pipe. Thus, the inside of the processing container 10 may be cooled or heated depending on the temperature of the gas, and a film having a shape and a film quality desired by the user may be formed in various processes. In addition, the heat load in the processing container 10 may be reduced.

In order to form a film having a more preferable shape, for example, the film formation rate in each region of the center, middle, and edge of the wafer may be output as a simulation result using the simulation model. Further, a contact amount of the gas with the wafer and a flow rate of the unused gas after the film formation may be output as a simulation result using the simulation model.

Based on the simulation results, the simulation model is optimized, and the temperature of the gas is directly controlled by the second heater using the optimized simulation model. As a result, a desirable difference in film formation rate is generated in each region of the center, middle, and edge of the wafer, whereby a desired film shape may be formed.

Figure 10:
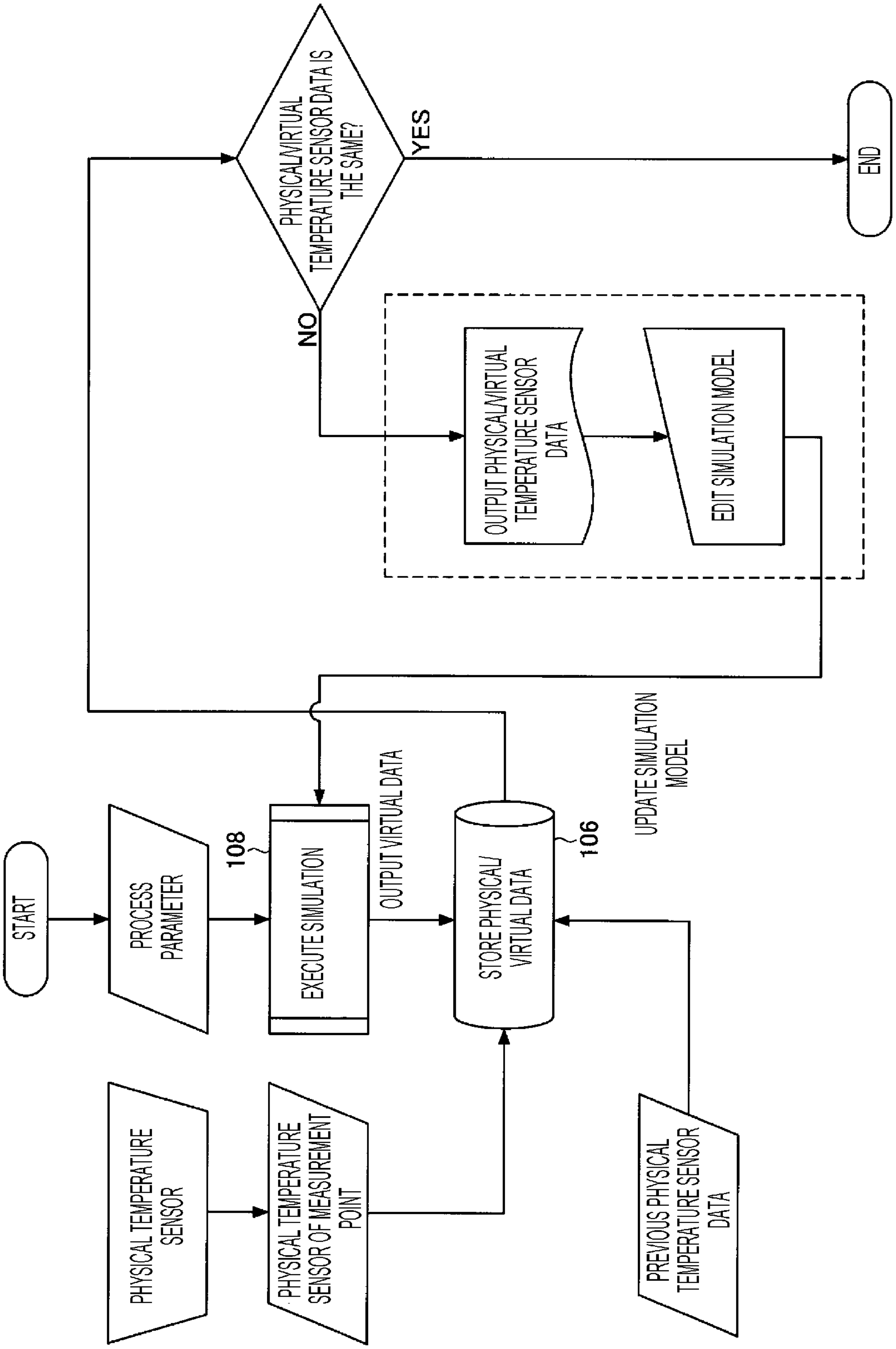
FIG. 10 is a diagram illustrating an example of a process for generating and updating a simulation model according to a process parameter including a gas temperature according to the embodiment.
Figure 11:
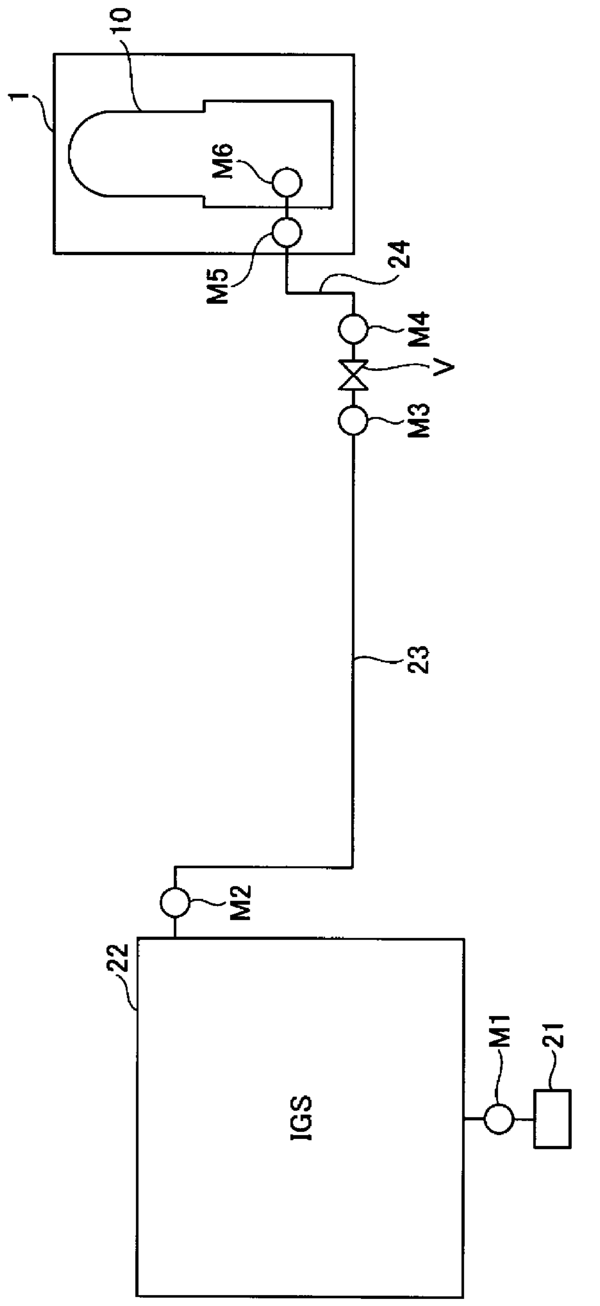
FIG. 11 is a diagram illustrating an example of disposing a temperature sensor for measuring a gas temperature according to the embodiment.

For example, the process illustrated in FIG. 10 may be performed in generating and updating the simulation model. FIG. 10 is a diagram illustrating an example of a process for generating and updating a simulation model according to the process parameters including the gas temperature of according to the embodiment. FIG. 11 is a diagram illustrating an example of disposing temperature sensors M1 to M6 for measuring the gas temperature.

The simulation execution unit 108 of the autonomous controller 4 acquires, for example, the power value of the heater, the set value of the blower, the flow rate of the gas, the elevating position of the wafer boat, and the temperature of the gas as examples of the process parameters of the process being executed by the semiconductor manufacturing apparatus 1. The simulation execution unit 108 outputs the virtual temperature sensor data and the virtual process result data by executing the simulation by the simulation model of the semiconductor manufacturing apparatus 1 according to the process parameters.

The physical temperature sensor measures the temperature at the measurement point and outputs the temperature as the physical temperature sensor data at the measurement point. In the example of FIG. 11, the temperature sensors M1 to M4 for measuring the gas temperature are provided as physical temperature sensors at each measurement point. The temperature sensor M1 measures the temperature of the gas in the gas pipe on the input side of the IGS 22 as the output side of the gas source 21. The temperature sensor M2 measures the temperature of the gas in the gas pipe at the outlet of the IGS 22. The temperature sensor M3 measures the temperature of the gas in the external pipe 23. The temperature sensor M4 corresponds to the temperature sensor 80 in FIG. 9, is located near the gas inlet port of the processing container 10, and measures the temperature of the gas in the gas inlet pipe 24. A valve V is provided between the temperature sensor M3 and the temperature sensor M4 to control the gas flow rate. Similar to the temperature sensor 80 of FIG. 9, the temperature sensors M1 to M4 directly measure the temperature of the gas in the gas pipe. The temperature sensors M5 and M6 measure the temperature inside the semiconductor manufacturing apparatus 1 (inside the processing container 10), and do not directly measure the temperature of the gas in the gas pipe.

The database 106 stores the output virtual temperature sensor data, the virtual process result data, the physical temperature sensor data of the measurement point, and the previous physical temperature sensor data.

The simulation result determination unit 110 compares the virtual temperature sensor data and the physical temperature sensor data stored in the database 106 for each measurement point, and determines whether the virtual temperature sensor data and the physical temperature sensor data of the same measurement point stored in the database 106 are the same as each other.

When it is determined that the virtual temperature sensor data and the physical temperature sensor data are the same, the simulation result determination unit 110 determines that the virtual temperature sensor data is correct. When it is determined that the virtual temperature sensor data and the physical temperature sensor data are not the same, the simulation result determination unit 110 outputs the physical temperature sensor data and the virtual temperature sensor data for recording.

Thereafter, for example, the simulation model is manually edited while performing a data verification offline, and the simulation model of the simulation execution unit 108 is updated.

In this way, in the generation and update of the simulation model, the simulation model of the simulation execution unit 108 may be updated as needed while performing the data verification offline. Further, in the generation and update of the simulation model, unless the physical specification of the target semiconductor manufacturing apparatus 1 is changed, the virtual data and the physical data may be compared and the process parameters may be edited according to the algorithm to perform an operation that produces the maximum result for the input data of the specification.

Since the temperature sensors M1 to M3 are installed to confirm the accuracy of the virtual sensor data calculated based on the simulation model, the temperature sensors M1 to M3 do not have to be installed in the final product shipped to the customer. However, the temperature sensor M4 is a temperature sensor that measures the temperature of the gas introduced into the processing container 10 and is mounted on the final product to measure the temperature of the gas as physical sensor data. Further, the temperature sensors M1 to M3 may be mounted on the final product, or the temperature sensors M4 may not be mounted on the final product.

As described above, according to the information processing apparatus, simulation method, and information processing system of the embodiment, it is possible to construct a simulation model including the temperature of the gas introduced in the semiconductor manufacturing apparatus as a process parameter. As a result, the process may be virtualized more accurately, and the stability of the process such as, for example, optimization of the film formation may be improved. In addition, fluctuations in gas temperature in the process results may be suppressed. The heat load in the processing container 10 may be reduced. Further, visualization of the gas in the gas pipe and virtualization of gas temperature control may be implemented.

The semiconductor manufacturing apparatus that executes the process including the simulation method of the present disclosure is not limited to the heat treatment film forming apparatus. The semiconductor manufacturing apparatus is applicable to any type of apparatus among an atomic layer deposition (ALD) apparatus, a capacitively coupled plasma (CCP), an inductively coupled plasma (ICP), a radial line slot antenna (RLSA), an electron cyclotron resonance plasma (ECR), and a helicon wave plasma (HWP).

Further, the semiconductor manufacturing apparatus of the present disclosure is applicable to either an apparatus using plasma or an apparatus not using plasma, as long as the apparatus performs a predetermined process (e.g., a film formation process, an etching process, etc.) on a substrate. The semiconductor manufacturing apparatus of the present disclosure is applicable to any of a single-wafer apparatus that processes substrates one by one, a batch apparatus that batch processes multiple substrates, and a semi-batch apparatus that batch processes multiple substrates smaller than the number of substrates batch processed by the batch apparatus.

According to an aspect of the present disclosure, it is possible to construct a simulation model in which the temperature of the gas introduced into the semiconductor manufacturing apparatus is included in the process parameters.

From the foregoing, it will be appreciated that various embodiments of the present disclosure have been described herein for purposes of illustration, and that various modifications may be made without departing from the scope and spirit of the present disclosure. Accordingly, the various embodiments disclosed herein are not intended to be limiting, with the true scope and spirit being indicated by the following claims.

What is claimed is:

1. An information processing apparatus comprising:

a physical sensor data acquisition circuitry configured to acquire physical sensor data measured at a semiconductor manufacturing apparatus that executes a process according to a process parameter;

a simulation execution circuitry configured to execute a simulation of a process state being executed by the semiconductor manufacturing apparatus by a simulation model of the semiconductor manufacturing apparatus according to the process parameter including the physical sensor data, and calculate virtual sensor data and virtual process result data;

a gas inlet pipe connected to a processing container of the semiconductor manufacturing apparatus;

a heater disposed in the gas inlet pipe, and configured to heat a gas in the gas inlet pipe; and a temperature sensor having a temperature measuring unit, the temperature sensor configured to penetrate a joint connected to the gas inlet pipe, wherein a temperature measuring unit of the temperature sensor does not contact the gas inlet pipe, and configured to directly measure a temperature of the gas in the gas inlet pipe, wherein the heater heats the gas in the gas inlet pipe based on the temperature of the gas directly measured by the temperature sensor, and wherein the physical sensor data acquired by the physical sensor data acquisition circuitry includes a temperature of the gas introduced into the semiconductor manufacturing apparatus that executes the process.

2. The information processing apparatus according to claim 1, wherein the physical sensor data acquisition circuitry acquires the temperature of the gas measured by the temperature sensor disposed in the gas inlet pipe for introducing the gas into a gas inlet port of the semiconductor manufacturing apparatus.

3. The information processing apparatus according to claim 1, further comprising: a process parameter adjustor configured to adjust the process parameter based on the physical sensor data and the virtual sensor data.

4. The information processing apparatus according to claim 3, wherein the process parameter adjustor adjusts the process parameter to obtain a process result desired by a user.

5. The information processing apparatus according to claim 1, further comprising: a simulation model editing circuitry configured to generate or update the simulation model so that the difference between the physical process result data after executing the process according to the process parameter and the virtual process result data calculated by the simulation execution circuitry is smaller and the difference between the physical sensor data and the virtual sensor data is smaller.

6. The information processing apparatus according to claim 5, wherein the simulation model editing circuitry generates or updates the simulation model using the physical process result data, the virtual process result data, the physical sensor data, and the virtual sensor data of a plurality of semiconductor manufacturing apparatuses.

7. The information processing apparatus according to claim 1, further comprising: a display control circuitry configured to visualize the process state of the semiconductor manufacturing apparatus and display the process state on a display during an execution of the process by using the physical sensor data, the virtual sensor data, and the virtual process result data.

8. The information processing apparatus according to claim 7, wherein the display control circuitry displays a form of comparing the process state of the semiconductor manufacturing apparatus based on the virtual process result data with the process state of the semiconductor manufacturing apparatus based on the physical process result data after the process according to the process parameter is executed.

9. The information processing apparatus according to claim 7, wherein when visualizing the process state of the semiconductor manufacturing apparatus and displaying the process state on the display, the display control circuit visualizes a measurement point of the physical sensor data and a measurement point of the virtual sensor data and displays the measurement points on the display.

10. A simulation method comprising:

providing an information processing apparatus that executes a simulation of a process state being executed in a semiconductor manufacturing apparatus by using a simulation model of the semiconductor manufacturing apparatus;

acquiring physical sensor data measured at the semiconductor manufacturing apparatus that executes the process according to a process parameter; and executing a simulation by the simulation model according to the process parameter including the physical sensor data, and calculating virtual sensor data and virtual process result data, wherein the information processing apparatus includes:

a gas inlet pipe connected to a processing container of the semiconductor manufacturing apparatus;

a heater disposed in the gas inlet pipe, and configured to heat a gas flowing through the gas inlet pipe; and a temperature sensor having a temperature measuring unit, the temperature sensor configured to penetrate a joint connected to the gas inlet pipe, wherein a temperature measuring unit of the temperature sensor does not contact the gas inlet pipe, and configured to directly measure a temperature of the gas in the gas inlet pipe, wherein the heater heats the gas in the gas inlet pipe based on the temperature of the gas directly measured by the temperature sensor, and wherein in the acquiring the physical sensor data, the acquired physical sensor data includes a temperature of the gas introduced into the semiconductor manufacturing apparatus that executes the process.

11. An information processing system comprising:

an apparatus controller that controls a semiconductor manufacturing apparatus; and an information processing apparatus that executes a simulation of a process state being executed in the semiconductor manufacturing apparatus by using a simulation model of the semiconductor manufacturing apparatus, wherein the apparatus controller controls a process executed in the semiconductor manufacturing apparatus, wherein the information processing apparatus includes: a physical sensor data acquisition circuitry configured to acquire physical sensor measured by the semiconductor manufacturing apparatus that executes the process according to a process parameter; a simulation execution circuitry configured to execute a simulation by the simulation model according to the process parameter including the physical sensor data and calculate virtual sensor data and virtual process result data; a gas inlet pipe connected to a processing container of the semiconductor manufacturing apparatus; a heater disposed in the gas inlet pipe, and configured to heat a gas flowing through the gas inlet pipe; and a temperature sensor having a temperature measuring unit, the temperature sensor configured to penetrate a joint connected to the gas inlet pipe, wherein a temperature measuring unit of the temperature sensor does not contact the gas inlet pipe, and configured to directly measure a temperature of the gas in the gas inlet pipe, wherein the heater heats the gas in the gas inlet pipe based on the temperature of the gas directly measured by the temperature sensor, and wherein the physical sensor data acquired by the physical sensor data acquisition circuitry includes a temperature of the gas introduced into the semiconductor manufacturing apparatus that executes the process.

12. The information processing system according to claim 11, wherein the physical sensor data acquisition circuitry acquires the temperature of the gas measured by the temperature sensor disposed in the gas inlet pipe for introducing the gas into a gas inlet port of the semiconductor manufacturing apparatus.

13. The information processing apparatus according to claim 1, further comprising a flow rate controller configured to control a flow rate of the gas; and an external pipe coupled between the flow rate controller and the gas inlet pipe.

14. The information processing apparatus according to claim 13, wherein the gas is heated by an external pipe heater while flowing through the external pipe to the gas inlet pipe.

15. The information processing apparatus according to claim 1, wherein the simulation model includes a reaction model of the gas on a surface of a wafer, and the simulation execution circuitry predicts, based on the temperature of the gas directly measured by the temperature sensor, a thickness of a film formed on the wafer.

16. The information processing apparatus according to claim 15, wherein the simulation execution circuitry calculates, as the virtual process result data, a film formation rate in each region of a wafer based on the temperature of the gas directly measured by the temperature sensor, and the simulation model is optimized based on the calculated film formation rate.

* * * * *